W. H. DEIDRICK.
SELF ADJUSTING PRESSURE SINK FLUSHER.
APPLICATION FILED DEC. 26, 1908.
917,717.
Patented Apr. 6, 1909.
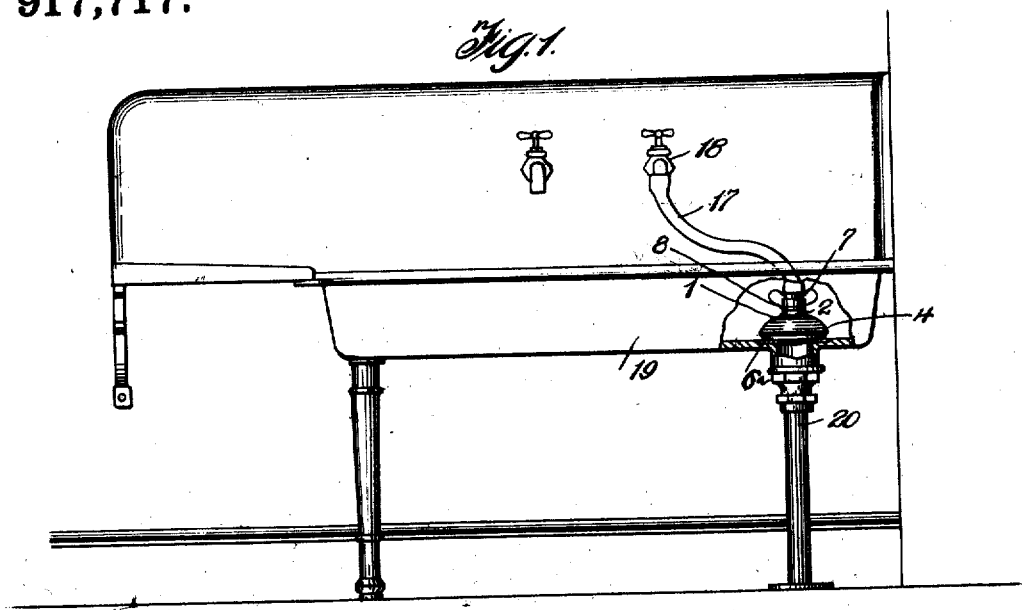
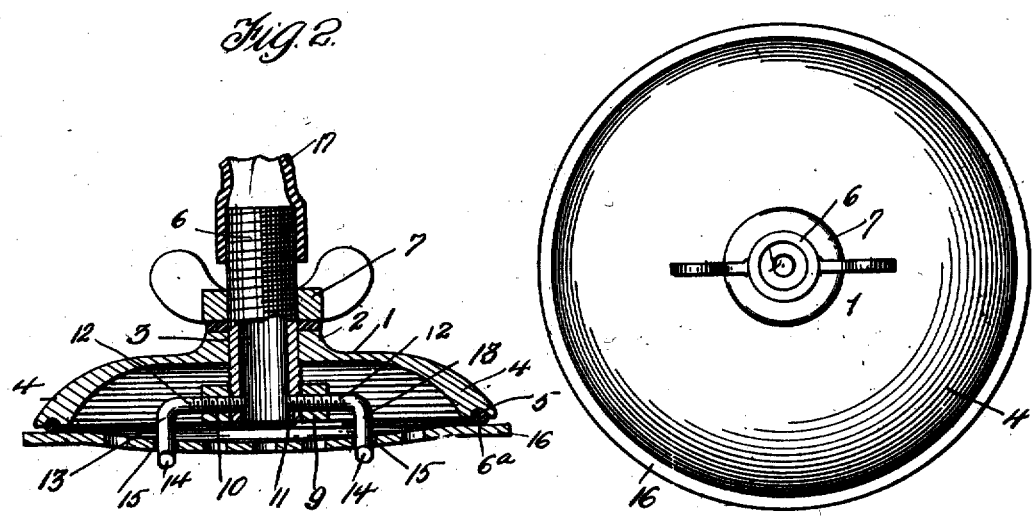

UNITED STATES PATENT OFFICE.

WILLIAM H. DEIDRICK, OF CHESTER, WEST VIRGINIA.

SELF-ADJUSTING PRESSURE SINK-FLUSHER.

No. 917,717.　　　Specification of Letters Patent.　　　Patented April 6, 1909.

Application filed December 26, 1908. Serial No. 469,322.

*To all whom it may concern:*

Be it known that I, WILLIAM H. DEIDRICK, a citizen of the United States of America, residing at Chester, in the county of Hancock and State of West Virginia, have invented certain new and useful Improvements in Self-Adjusting Pressure Sink-Flushers, of which the following is a specification, reference being had therein to the accompanying drawings.

This invention relates to a self-adjusting pressure sink flusher, and the primary object of my invention is to provide a novel device by which the pressure of water can be utilized for removing foreign matter and coagulations from a sink drain pipe or other drain pipes above which the device can be mounted.

Another object of my invention is to provide a simple, durable and inexpensive flushing device that can be advantageously used by landlords in maintaining the drain pipes of tenant houses in an open and sanitary condition.

My invention aims to provide a flusher that can be adjusted and clamped to the perforated plate or screen of a drain opening and confine above said perforated plate or screen, the pressure of water from a hot or cold water spigot, whereby the pressure of water will gradually remove foreign matter from the drain pipe that tends to choke and prevent the free passage of an ordinary flow of water.

The device by which I accomplish this result comprises a hood and adjustable clamps for clamping the hood to the perforated plate of a sink. The hood is provided with a suitable connection adapted to be placed in engagement with a faucet or spigot for conveying pressure of water to the hood or directly into the drain pipe for forcing the coagulation of said pipe through to the sewer mains.

The detail construction entering into my invention will be hereinafter described and then specifically claimed.

Figure 1 is a front elevation of a sink partly broken away, illustrating the attachment in position for flushing the drain pipe of a sink, Fig. 2 is an enlarged vertical section of the flushing device clamped to the perforated plate, and Fig. 3 is a plan of the same with the hose thereof detached.

In the accompanying drawings, 1 designates a circular hood having a central boss 2 provided with a vertical opening 3. The peripheral edges of the hood 1 are reinforced, as at 4, and the bottom edges thereof provided with an annular groove 5 for a resilient packing ring $6^a$.

Adjustably mounted in the central boss 2 of the hood 1 is an exteriorly threaded pipe 6, and to firmly hold said pipe in engagement with the boss 2 a wing thumb nut 7 is mounted upon said pipe and a gasket 8 interposed between said nut and the boss 2 to form a non-leakable connection between the pipe and said boss. The lower end of the pipe 6 within the hood 1 is provided with a nut 9 having oppositely disposed threaded openings 10 formed therein adapted to aline with similar openings 11 formed in the lower end of the pipe 6. Adjustably mounted in the openings 10 and 11 are the threaded shanks 12 of clamping members 13, said members having angular extensions 14. These clamping members are adapted to extend through the perforations 15 of a sink plate 16, with the angular extensions 14 engaging under said sink plate, while the resilient packing ring $6^a$ of the hood is held in engagement with the upper surface of the plate 16 by the wing thumb nut 7.

The upper end of the pipe 6 is connected by a hose or flexible conduit 17 to a faucet or spigot 18 located in proximity to a sink 19. When the faucet or spigot 18 is open, the pressure of water is confined within the hood 1 and the drain pipe 20 of the sink until the foreign matter or coagulation therein cuts away and allows the water to freely pass through the drain pipe.

Since the pipe 6 can be adjusted with relation to the hood 1 and the clamping members 12 adjusted laterally relative to said pipe, the flushing device can be easily clamped to the concave perforated plate irrespective of the location of the perforations of said plate and to any perforated concave plate wherein the depth of the concavity of said plate falls within the scope of the vertical adjustment of the pipe 6.

Hot and cold water, steam and air under pressure can be utilized when convenient in lieu of a pressure of water for cleansing a drain pipe or similar structure obstructed by foreign matter.

While in the drawings forming a part of this application there is illustrated the preferred embodiments of my invention, I would have it understood that the detail construction can be varied or changed as to shape, proportion and manner of assemblage without departing from the spirit of the invention.

Having now described my invention what I claim as new, is:—

1. In a flusher, the combination with a perforated plate, of a hood mounted upon said plate, a packing ring interposed between the peripheral edges of said hood and said plate, a vertical adjustable pipe carried by said hood, a nut adjustably mounted upon said pipe for holding said hood thereon, a nut carried by said pipe within said hood, and oppositely disposed clamping members adjustably mounted in said nut and adapted to extend through the perforations of said plate, said members having angularly disposed extensions adapted to engage the under side of said plate and hold said hood in engagement with said plate.

2. In a flusher, the combination with a perforated plate, of a hood mounted upon said plate, a vertical pipe adjustably mounted in said hood, a nut carried by the end of said pipe within said hood, and clamping members adjustably carried by said nut for extending through the perforations of said plate and engaging the under side thereof to hold said hood in engagement with said plate.

3. In a flusher, the combination with a perforated plate, of a hood mounted upon said plate, a vertical pipe adjustably mounted in said hood, clamping arms adjustably supported by the lower end of said pipe within said hood and adapted to extend through the perforations of said plate and engage the under side thereof for holding said hood upon said plate.

4. In a sink flusher, the combination with a drain pipe having a screen at the upper end thereof, of a hood adapted to be clamped upon said screen, a pipe adjustably mounted in said hood for conveying water to said drain pipe, and clamping members adjustably supported by said pipe within said hood and adapted to engage in said screen for holding said hood in engagement therewith.

In testimony whereof I affix my signature in the presence of two witnesses.

WILLIAM H. DEIDRICK.

Witnesses:
MAX H. SROLOVITZ,
K. H. BUTLER.